United States Patent
Kamoi

(10) Patent No.: US 9,866,715 B2
(45) Date of Patent: Jan. 9, 2018

(54) IMAGE FORMING APPARATUS AND METHOD FOR CONTROLLING IMAGE FORMING APPARATUS TO SELECTIVELY PRINT AND DELETE ATTACHED FILE IN ELECTRONIC MAIL

(71) Applicant: CANON KABUSHIKI KAISHA, Tokyo (JP)

(72) Inventor: Keiko Kamoi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/132,781

(22) Filed: Apr. 19, 2016

(65) Prior Publication Data

US 2016/0316089 A1 Oct. 27, 2016

(30) Foreign Application Priority Data

Apr. 23, 2015 (JP) ................................. 2015-088799

(51) Int. Cl.
*H04N 1/00* (2006.01)

(52) U.S. Cl.
CPC ..... *H04N 1/00962* (2013.01); *H04N 1/00204* (2013.01); *H04N 1/00212* (2013.01); *H04N 1/00244* (2013.01); *H04N 2201/0094* (2013.01)

(58) Field of Classification Search
CPC ........... H04N 1/00962; H04N 1/00212; H04N 1/00244

USPC ............................. 358/1.15, 1.14, 1.16, 1.13
See application file for complete search history.

(56) References Cited

U.S. PATENT DOCUMENTS

| | | | | |
|---|---|---|---|---|
| 2002/0013869 | A1* | 1/2002 | Taniguchi | H04L 29/06 710/33 |
| 2005/0111028 | A1* | 5/2005 | Kim | G03G 15/5012 358/1.14 |
| 2008/0170253 | A1* | 7/2008 | Mohammad | H04N 1/00233 358/1.15 |
| 2013/0201531 | A1* | 8/2013 | Sekiguchi | H04L 12/5835 358/402 |
| 2013/0335771 | A1* | 12/2013 | Sugiura | G06K 15/408 358/1.14 |

FOREIGN PATENT DOCUMENTS

JP 5-176146 A 7/1993

\* cited by examiner

*Primary Examiner* — Jamares Q Washington
(74) *Attorney, Agent, or Firm* — Canon U.S.A., Inc. IP Division

(57) ABSTRACT

An MFP receives an electronic mail from a mail server. The MFP prints an image based on an attached file of the received electronic mail. If an abort instruction is not accepted during printing of the image, the electronic mail is deleted from the mail server after printing of the image based on the attached file of the received electronic mail is completed. On the other hand, if the abort instruction is accepted during printing of the image, printing of the image is aborted without deleting the received electronic mail from the mail server.

11 Claims, 11 Drawing Sheets

FIG. 7

RECEIVED JOB HISTORY — 701

- I-FAX 10:45 AM OK
- I-FAX 11:30 AM NG #123 — 702
- I-FAX 01:10 PM OK
- I-FAX 01:15 PM OK
- I-FAX 01:20 PM OK
- I-FAX 01:21 PM OK

DETAILED INFORMATION — 703

RECEPTION NUMBER 0010
RESULT: NG STOP #123
JOB IS ABORTED.
START TIME: 04/20 11:30 AM
DESTINATION: user@example.com
JOB TYPE: I-FAX

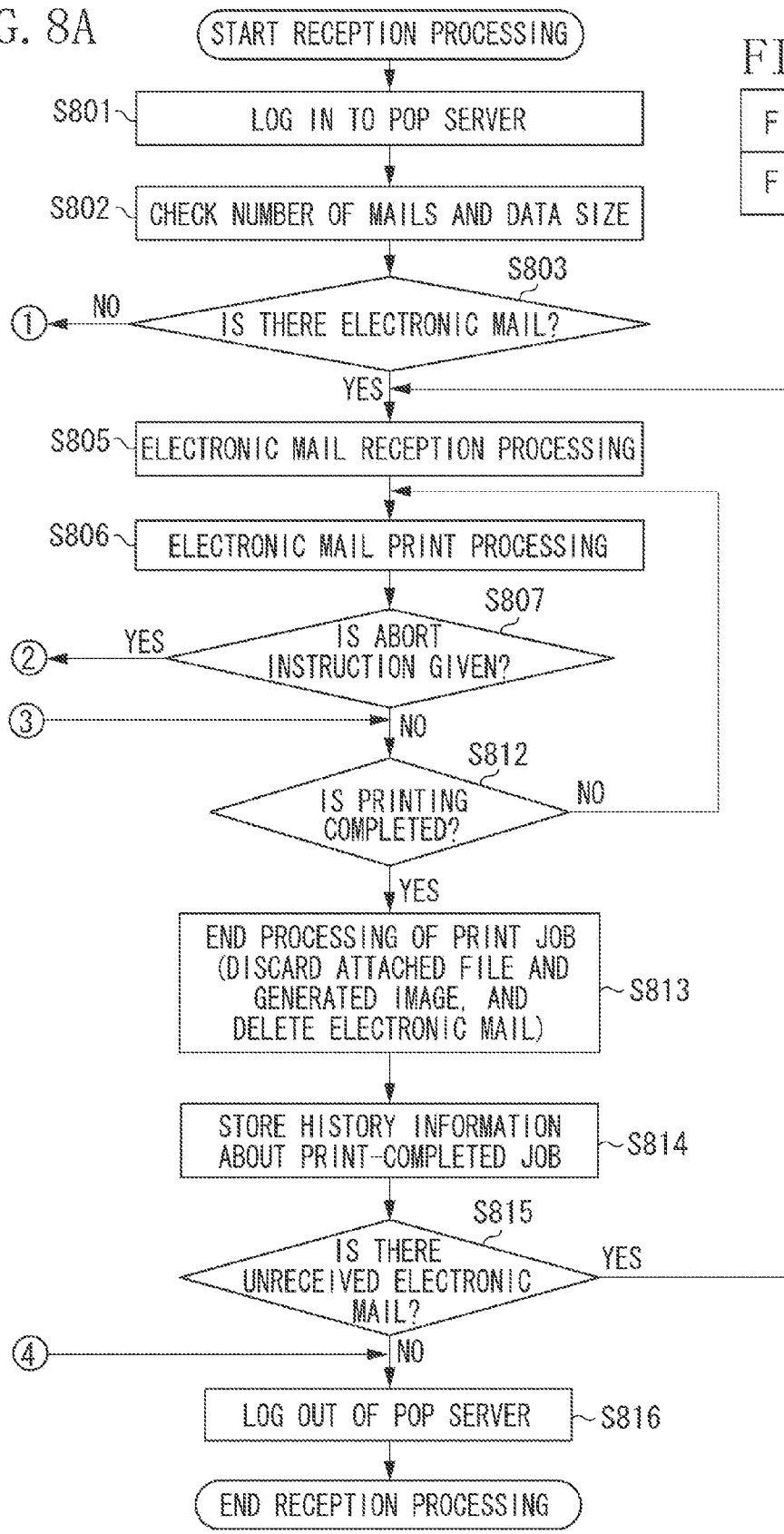

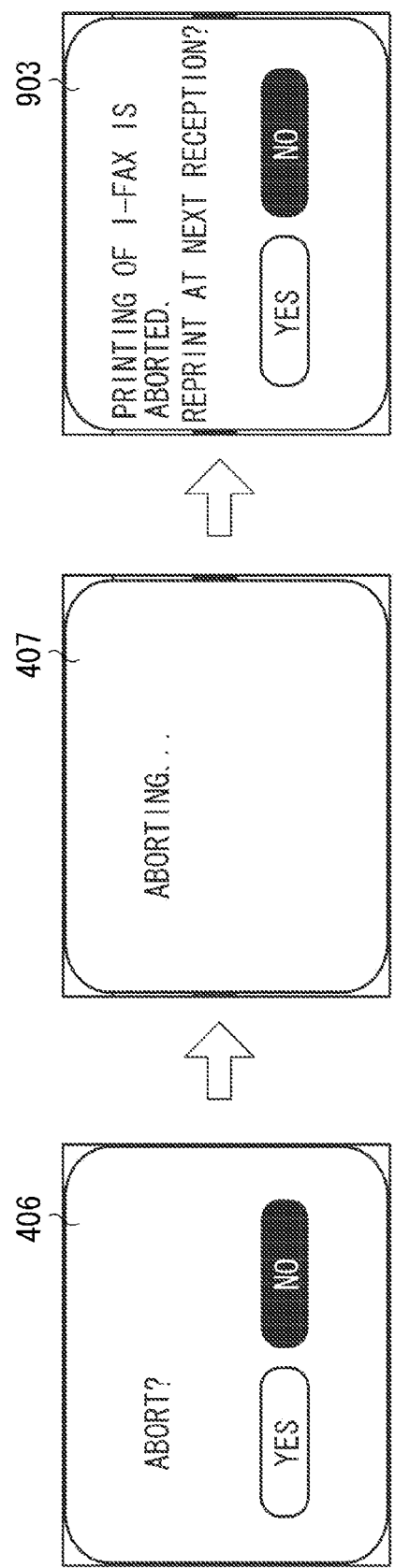

IMAGE FORMING APPARATUS AND METHOD FOR CONTROLLING IMAGE FORMING APPARATUS TO SELECTIVELY PRINT AND DELETE ATTACHED FILE IN ELECTRONIC MAIL

BACKGROUND

Field

Aspects of the present invention generally relate to an image forming apparatus that prints an image based on an attached file of an electronic mail received from a mail server.

Description of the Related Art

An image forming apparatus including a function for receiving an electronic mail from a mail server and printing an image based on an attached file of the received electronic mail has been known. An image forming apparatus including such a function can receive electronic mails from a mail server at predetermined time intervals and/or based on a user's manual instructions. Japanese Patent Application Laid-Open No. 5-176146 discusses an image forming apparatus that, if instructed by a user to abort printing while printing an image transmitted by facsimile, can abort a facsimile reception operation and abort the printing.

After printing of an image starts with some print settings, a user may sometimes notice an imperfection in the print settings and want to abort the printing in process and restart the printing with changed print settings.

The image forming apparatus discussed in Japanese Patent Application Laid-Open No. 5-176146 can, if instructed to abort printing while printing the image transmitted by facsimile, abort the printing. However, reprinting of the image is not taken into consideration.

If printing of an image based on a file received from an external device is instructed to be aborted, the image can be reprinted by performing control to abort the printing so that the received file or the image is left inside the image forming apparatus. Such processing enables reprinting after the print settings are changed.

An image forming apparatus with limited hardware resources (storage area in particular) unfortunately does not have much storage area for temporarily storing data. If images needed for printing are temporarily stored in such an image forming apparatus, the storage area becomes tight and an operation of other functions of the image forming apparatus may be affected.

Take a case of printing an image based on an attached file of an electronic mail received from a mail server. If the electronic mail still remains in a mail box on the mail server, the image forming apparatus can receive the same electronic mail again and perform reprinting. However, electronic mails are usually deleted from the mail server after the electronic mails have been received. If the electronic mail is deleted while the printing is aborted, the reprinting is not able to be performed.

SUMMARY

Aspects of the present invention are generally directed to providing a mechanism where, if printing of an image based on an attached file of an electronic mail received from a mail server is aborted, the image can be reprinted.

According to an aspect of the present invention, an image forming apparatus includes a reception unit configured to receive an electronic mail from a mail server, a first storage unit configured to store an image based on a file attached to the electronic mail, a printing unit configured to print the image on a sheet, a deletion unit configured to delete an electronic mail stored in the mail server, an acceptance unit configured to accept an abort instruction via an operation unit, and a control unit configured to, in a case where the abort instruction is not accepted during printing of the image based on the file attached to the received electronic mail, perform control to delete the received electronic mail from the mail server and delete the image based on the file attached to the received electronic mail from the first storage unit after printing of the image is completed, and in a case where the abort instruction is accepted during printing of the image based on the file attached to the received electronic mail, perform control to abort printing of the image, not to delete the received electronic mail from the mail server, and to delete the image based on the file attached to the received electronic mail from the first storage unit.

Further features of aspects of the present invention will become apparent from the following description of exemplary embodiments with reference to the attached drawings.

BRIEF DESCRIPTION OF THE DRAWINGS

FIG. 7 is a diagram illustrating operation screens displayed on the panel and transition of the operation screens.

FIG. 9 is a diagram illustrating operation screens displayed on the panel and transition of the operation screens.

DESCRIPTION OF THE EMBODIMENTS

Exemplary embodiments of the present invention will be described in detail below with reference to the drawings. The following exemplary embodiments are not intended to limit aspects of the invention set forth in the claims. All combinations of features described in the exemplary embodiments are not necessarily indispensable to solving aspects of the invention.

Figure 1:
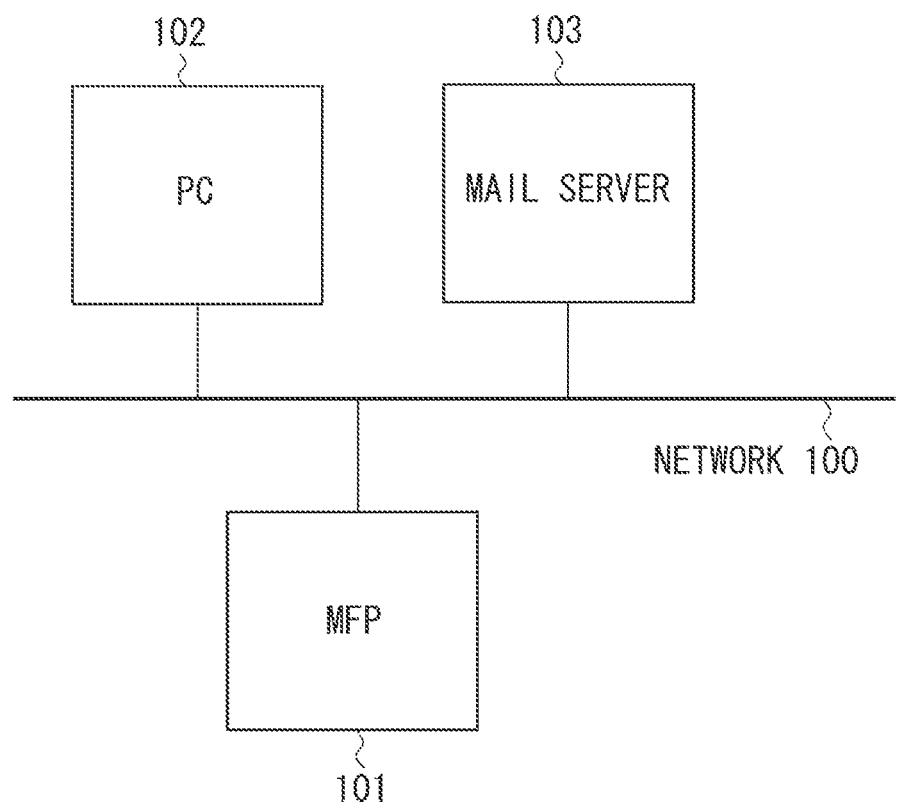
FIG. 1 is a block diagram illustrating an image forming system.

A first exemplary embodiment of the present invention will initially be described. FIG. 1 is a block diagram illustrating an image forming system according to the present exemplary embodiment. A multifunctional peripheral (MFP) 101, a personal computer (PC) 102, and a mail server 103 are connected on a network 100 in a mutually communicable manner. In the present exemplary embodiment, the MFP 101 will be described as an example of an image forming apparatus, and the PC 102 as an example of an information processing apparatus. The MFP 101 and the PC 102 are connected to the Internet (not illustrated) via the network 100, and can transmit and receive electronic mails to/from external devices via a plurality of mail servers.

A mail client is installed on the PC 102. The mail client is software for transmitting created electronic mails to external devices (such as an information processing apparatus similar to the PC 102 or an image forming apparatus) via a mail server 103, and for receiving and displaying electronic mails from the external devices.

The mail server 103 receives electronic mails transmitted from a mail client on a transmission side (a transmission source). The received electronic mails are sorted into mail boxes provided for respective electronic mail addresses, and stored in a storage (not illustrated). Each electronic mail address is managed as linked with user information (a username and a password). The stored electronic mails are distributed according to requests from the mail client on a reception side (a transmission destination).

The mail client of the PC 102 can receive electronic mails sorted in the mail boxes of the mail server 103 by using communication protocols such as the Post Office Protocol version 3 (POP3) and the Internet Message Access Protocol (IMAP). The mail client can delete electronic mails sorted in the mail boxes of the mail server 103 from the mail server 103 by using similar communication protocols. A mail client having similar functions is also installed on the MFP 101.

The MFP 101 includes a reading function for reading an image on a sheet and a print function for printing an image on a sheet. The MFP 101 can receive an electronic mail transmitted from the PC 102 or other image forming apparatuses (not illustrated) via the mail server 103. The MFP 101 can print an image based on an attached file of a received electronic mail. The MFP 101 can receive and print an electronic mail transmitted based on the Internet facsimile data transfer method T.37 (I-fax) according to the International Telecommunication Union Telecommunication Standardization Sector (ITU-T) recommendations, and can transmit an electronic mail with an attached image.

In the present exemplary embodiment, the mail server 103 is described to include both a transmission server (Simple Mail Transfer Protocol (SMTP) server) function and a reception server (Post Office Protocol (POP) server) function. However, this is not restrictive. For example, a transmission server and a reception server may be separately configured for load sharing.

Figure 2:
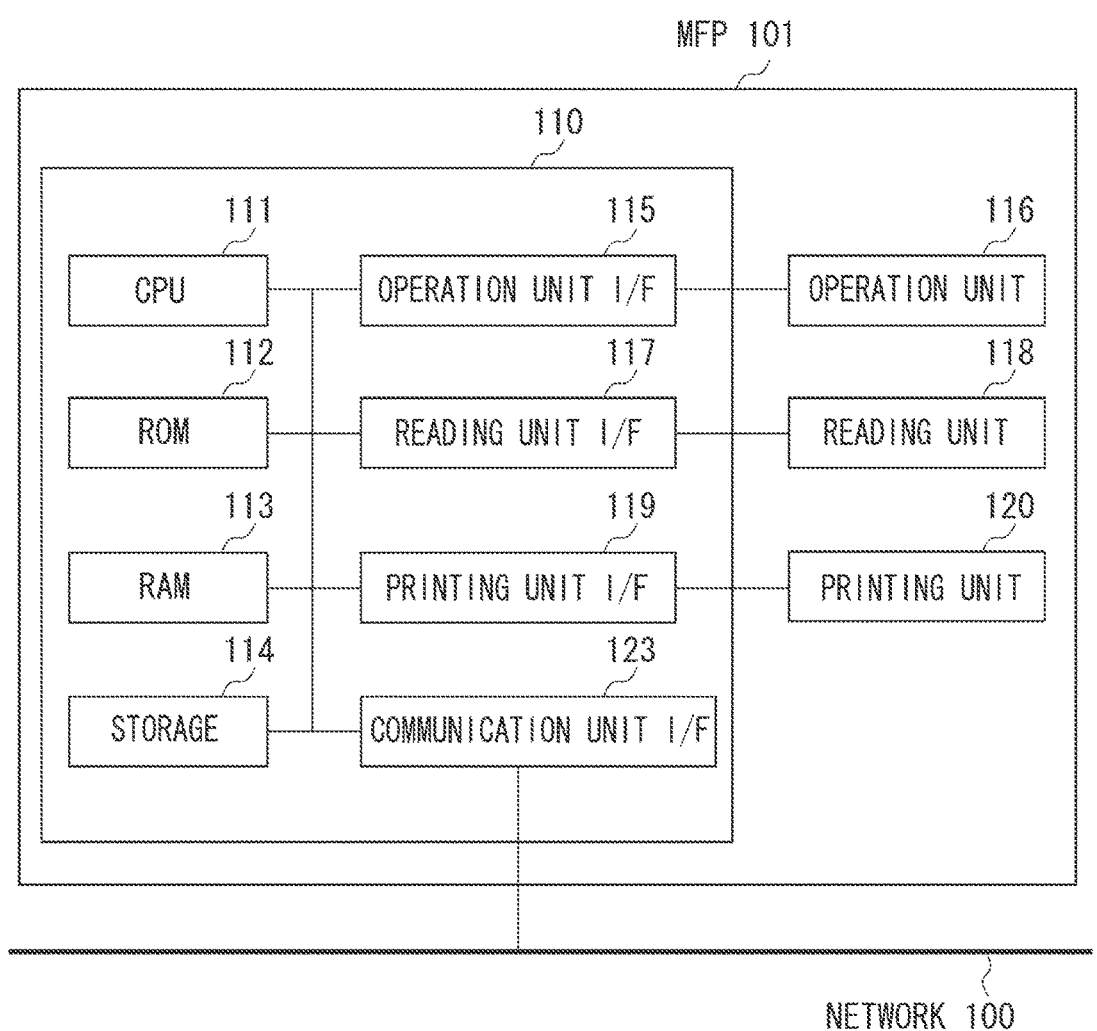
FIG. 2 is a block diagram illustrating a configuration of a multifunction peripheral (MFP).

FIG. 2 is a block diagram illustrating a configuration of the MFP 101 according to the present exemplary embodiment. A control unit 110 including a central processing unit (CPU) 111 controls an operation of the entire MFP 101. The CPU 111 reads a control program or programs stored in a read-only memory (ROM) 112 or a storage 114, and performs various types of control including a read control and a print control. The ROM 112 stores a control program and a boot sequence executable by the CPU 111. A random access memory (RAM) 113 is a main storage memory of the CPU 111. The RAM 113 is used as a work area and a temporary storage area for loading various control programs stored in the ROM 112 and the storage 114. The storage 114 includes a flash memory. The storage 114 stores image data, print data, various programs, and various types of setting information. In the MFP 101 according to the present exemplary embodiment, the storage areas of the RAM 113 and the storage 114 are small in size and not able to provide a large storage area for holding image data and print data.

In the MFP 101 according to the present exemplary embodiment, the single CPU 111 executes each process illustrated in the flowcharts described below by using one memory (RAM 113). However, other modes may be employed. For example, a plurality of CPUs, RAMs, ROMs, and storages may cooperate to execute each process illustrated in the flowcharts described below. Part of the processing may be executed by using a hardware circuit such as an application specific integrated circuit (ASIC) and a field-programmable gate array (FPGA).

An operation unit interface (I/F) 115 connects an operation unit 116 and the control unit 110. The operation unit 116 displays information to a user and inputs instructions from the user.

A reading unit I/F 117 connects a reading unit 118 and the control unit 110. The reading unit 118 reads an image on a document placed on an automatic document feeder (ADF) (not illustrated) or a platen glass (not illustrated), and converts the image into image data such as binary data. The image data generated by the reading unit 118 is transmitted to an external device or printed on a sheet.

A printing unit I/F 119 connects a printing unit 120 and the control unit 110. The CPU 111 transfers an image to be printed (image data to be printed) to the printing unit 120 via the printing unit I/F 119. The printing unit 120 prints the image on a sheet fed from a feed cassette (not illustrated). The printing unit 120 may use an electrophotographic printing method or an inkjet printing method. Other printing methods may be also applied.

The control unit 110 is connected to the network 110 via a communication unit I/F 123. The communication unit I/F 123 transmits image data and information to an external device on the network 100, and receives print data and information from an information processing apparatus on the network 100. For example, the MFP 101 can perform the foregoing transmission and reception of electronic mails as well as transmission using other protocols (for example, the File Transfer Protocol (FTP) and Server Message Block (SMB)) via the communication unit I/F 123.

Figure 3:
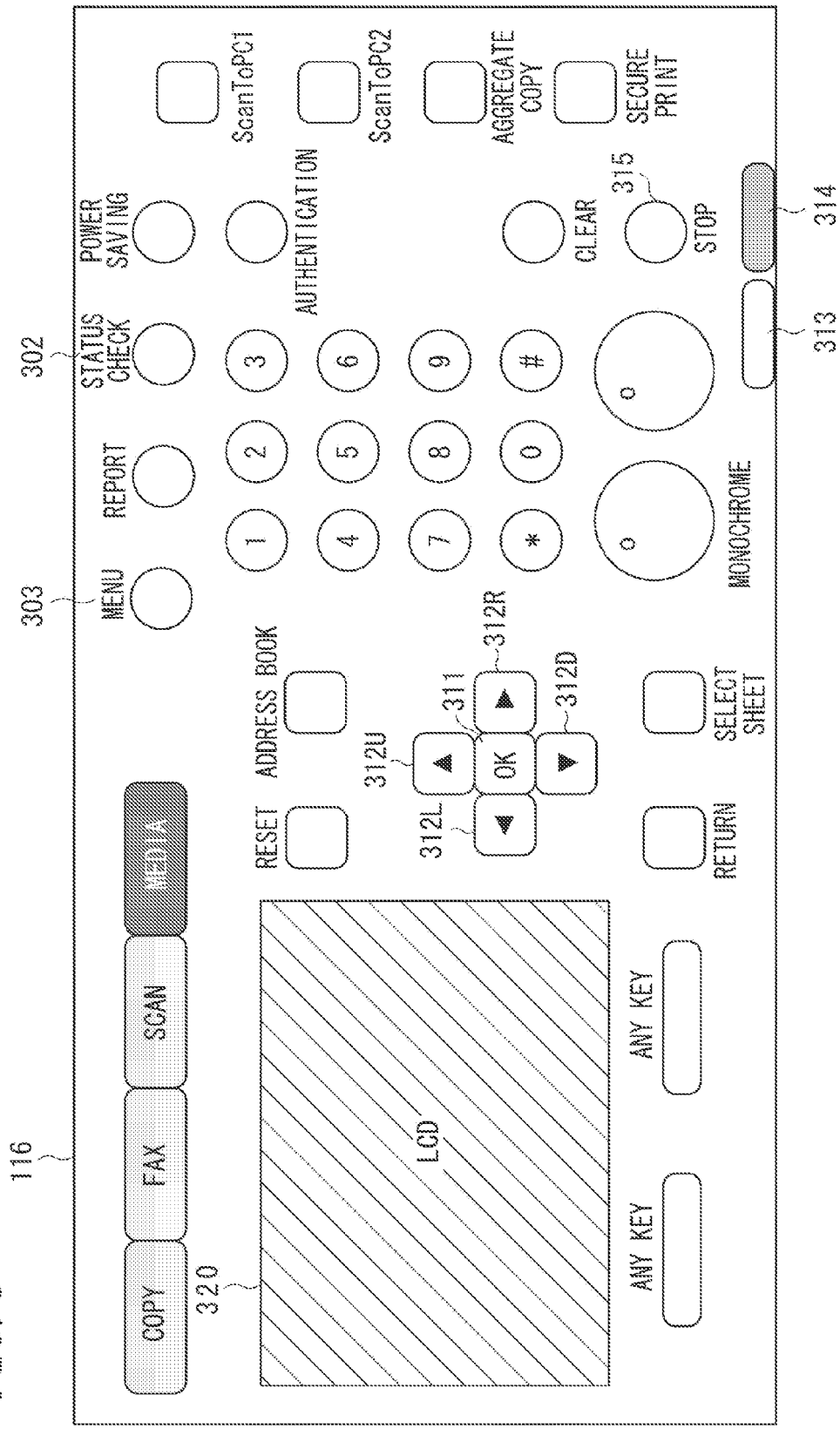
FIG. 3 is an external view illustrating an operation unit.

FIG. 3 is an external view illustrating the operation unit 116. The operation unit 116 includes a touch panel 320 which displays operation screens to be described below, and various hardware keys. The touch panel 320 and the various hardware keys function as an acceptance unit for accepting instructions from a user.

The operation unit 116 includes scroll keys 312 for selecting an option on a screen displayed on the touch panel 320, and an OK key 311 for determining the option selected by the scroll keys 312. The user can specify one item among options on the screen by using the scroll keys 312 and the OK key 311. The user can also specify the options displayed on the touch panel 320 by directly touching the options with a finger or an object such as a stylus. In the present exemplary embodiment, the method using the touch panel 320 and the method using the hardware keys both are described to be provided as a method for selecting the options displayed on the touch panel 320. However, this is not restrictive. For example, the options may be specified only by touch operations without the provision of the hardware keys, such as the scroll keys 312 and the OK key 311, for specifying the options on the touch panel 320.

Lamps 313 and 314 are intended to notify the user of a state of the MFP 101. The lamp 313 lights up during reception of an electronic mail and during printing. The lamp 314 lights up when some error occurs.

A stop key 315 is a hardware key for interrupting processing being executed by the MFP 101. In the present exemplary embodiment, the stop key 315 is used to abort processing for receiving an electronic mail and processing for printing an image based on an attached file of an electronic mail.

A status check key 302 is for displaying a screen (status check screen) for checking the state of the MFP 101. In the present exemplary embodiment, the user can check statuses of the MFP 101 and make an inquiry for an electronic mail via the status check screen. The status check screen can be displayed on the touch panel 320 with higher priority if a screen of other functions (for example, a copy function, a transmission function, and a reception print function to be described below) is displayed on the touch panel 320. If a user operation to close the status check screen is made, the CPU 111 makes the screen to be displayed on the touch panel 320 transition to an original screen.

Figure 4:
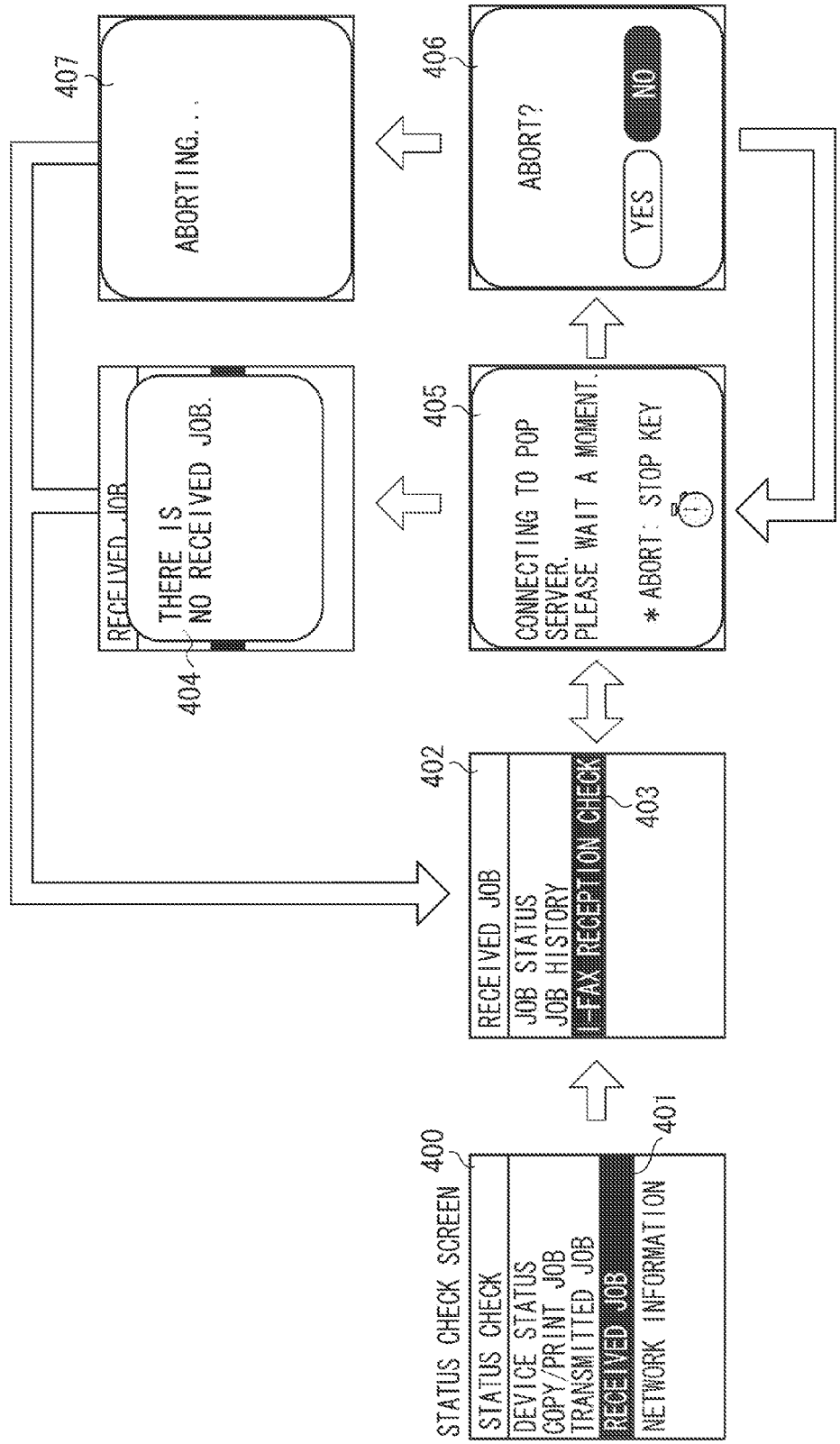
FIG. 4 is a diagram illustrating operation screens displayed on a panel and transition of the operation screens.

Now, the role of the status check screen in the present exemplary embodiment will be described. The user can press the status check key 302 to check a status of a job or a status of the MFP 101. FIG. 4 is a diagram illustrating examples of screens that the CPU 111 displays on the touch panel 320 of the operation unit 116.

If the status check key 302 is pressed, the CPU 111 displays a status check screen 400 on the touch panel 320. The user can check a job execution status or history information of the MFP 101 via the status check screen 400. The user can specify "device status" to check the remaining amount of sheets to be used for printing and the remaining amount of color material (toner or ink) to be used for printing. The user can check other statuses of the MFP 101 (for example, information about an error and a warning) via the status check screen 400.

On the status check screen 400, the user can perform operations related to a reception print function. An option 401 is one to be used in checking the status of a received job or performing manual reception of an electronic mail (details will be described below).

<Reception Print Function>

A reception print function for printing an image (hereinafter, referred to as a reception image) based on an attached file of a received electronic mail will be described. The reception print function is for performing reception and printing of the foregoing I-fax. The reception print function may support electronic mails not compliant with the T.37 method. In such a case, for example, the reception pint function may be configured to be able to receive and print an electronic mail to which a Portable Document Format (PDF) file not compliant with the I-fax standard is attached.

By the reception print function according to the present exemplary embodiment, an inquiry to a POP server (the mail server 103) is made to execute the reception and printing of an electronic mail. The user can give an instruction to perform manual reception of an electronic mail via the operation unit 116. The CPU 111 can automatically make inquiries at regular inquiry intervals set in the MFP 101.

The user can make a setting about the transmission and reception of an electronic mail as a setting item related to the MFP 101. If the setting related to the transmission and reception of an electronic mail is specified via a menu screen (not illustrated), the CPU 111 displays a setting screen 1000 (FIG. 10) related to an electronic mail on the touch panel 320.

Figure 10:
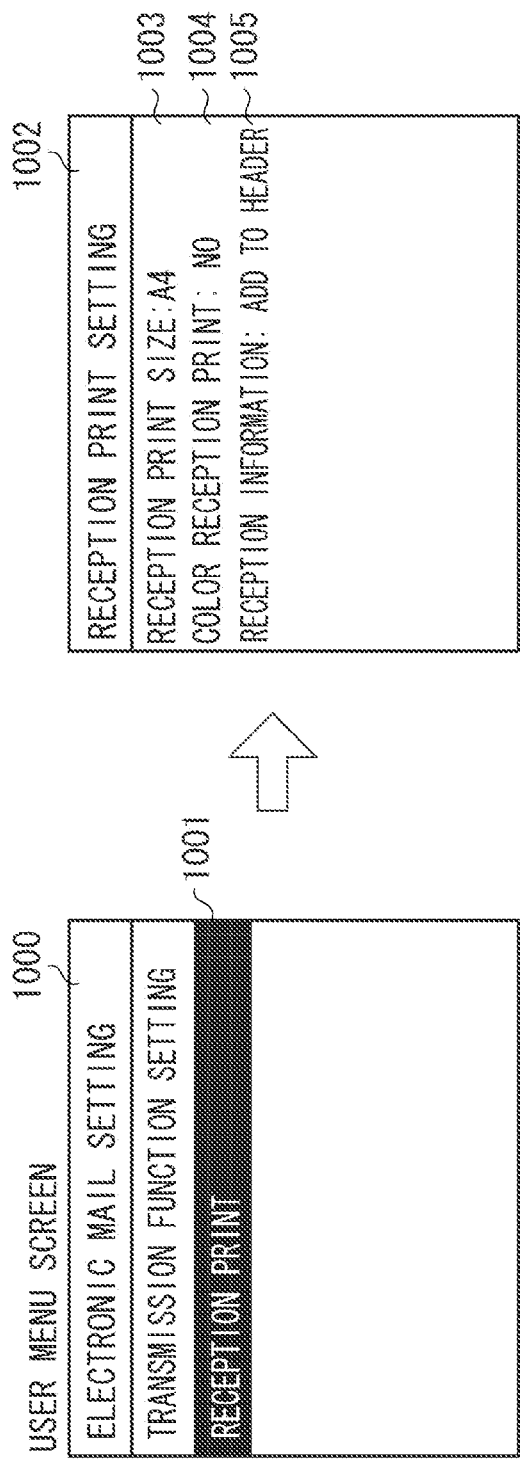
FIG. 10 is a diagram illustrating operation screens displayed on the panel and transition of the operation screens.

FIG. 10 is a diagram illustrating examples of screens that the CPU 111 displays on the touch panel 320 of the operation unit 116. FIG. 10 illustrates setting screens related to an electronic mail. An option 1001 is one used to make settings of the reception print function. If the option 1001 is specified, the CPU 111 displays a setting screen related to reception printing. A screen 1002 is an example of the setting screen related to the reception printing.

The user can set, via the screen 1002, the size of sheets used for the reception print function and a control method for a case where a color image is received. An option 1003 is one for setting the sheet size used by the reception print function. In the illustrated example, A4 is set as a sheet size. An option 1004 is one for setting whether to perform color printing if a color image is received. If the user specifies "NO," the MFP 101 is set to a "monochrome print mode" in which, if a color image is received, the color image is converted into and printed in monochrome. If the user specifies "YES," the MFP 101 is set to a "color printing mode" in which, if a color image received, the color image is printed in color.

An option 1005 is one for setting whether to print reception information. As employed herein, the reception information refers to information about a mail address of the transmission source and the date and time of reception. The user can specify the option 1005 to set whether to print the reception information. If the reception information is to be printed, the user can set a position where to add the reception information (for example, add to a header or add to a footer).

In such a manner, in the present exemplary embodiment, the user can make settings for a case of printing an image based on an attached file of an electronic mail. Such settings are just examples, and other settings may also be able to be made. The settings are stored in the storage 114, and referred to as appropriate when the CPU 111 performs printing of an image based on an attached file of an electronic mail.

The reception print function will be described by using a manual inquiry to the POP server as an example. In the present exemplary embodiment, the POP server's address needed to perform communication with the POP server and user information (a user identifier (ID) and a password) needed for authentication by the POP server are previously set by an administrator and stored in the storage 114.

As illustrated in FIG. 4, the user can specify the option 401 from the status check screen 400 to open a received job screen 402. The user can give an inquiry instruction to the POP server via the received job screen 402 illustrated in FIG. 4. If an option 403 is specified via the operation unit 116, the CPU 111 starts an inquiry to the POP server. The CPU 111 displays a screen 405 notifying the user that a connection is being made to the POP server on the touch panel 320.

Here, the CPU 111 performs processing for receiving an electronic mail from the POP server, and print processing. During the reception of the electronic mail, the CPU 111 blinks the lamp 313. After the reception of the electronic mail is completed, the CPU 111 lights up the lamp 313 while printing an image based on an attached file of the electronic mail. Such processing allows the user to determine the status of the reception print function by checking the state of the lamp 313. In the present exemplary embodiment, the reception status is notified of by using the lamp 313. However, a reception-related status may be displayed on the touch panel 320.

When the print processing is completed, the CPU 111 discards the received electronic mail and the image. The CPU 111 also deletes the received electronic mail from the POP server. When the deletion of the electronic mail is completed, the CPU 111 makes the screen to be displayed on the touch panel 320 transition to the received job screen 402, and ends the reception print processing.

If there is no electronic mail to be received in the POP server, the CPU 111 displays a popup screen 404 and ends the reception print processing. If a predetermined time (for example, two seconds) set in advance has elapsed with the popup screen 404 displayed, the CPU 111 closes the popup screen 404 and returns to the received job screen 402. If the printing of the image is completed or if there is no electronic mail to be received, the CPU 111 turns off the lamp 313 and ends processing.

During the reception of an electronic mail or during the printing of an image based on an attached file of an electronic mail, the user can give an abort instruction via the operation unit 116 to abort the reception processing or the print processing. If the stop key 315 is pressed during the reception of an electronic mail or during the printing of an image based on an attached file of an electronic mail, the CPU 111 makes the screen to be displayed on the touch panel 320 transition to a confirmation screen 406. If "YES" is specified via the confirmation screen 406, the CPU 111 aborts the reception processing or the print processing. During abort processing, the CPU 111 displays a screen 407 indicating that an abort is in process on the touch panel 320. When the abort processing is completed, the screen 407 transitions to the received job screen 402. If "NO" is specified via the confirmation screen 406, the confirmation screen 406 returns to the screen 405.

If the CPU 111 automatically makes inquiries, the CPU 111 performs the reception and printing of an electronic mail in the background without displaying the screens illustrated in FIG. 4 on the touch panel 320. In such a case, the user can check the state of the lamp 313 to determine the state of the reception print function being automatically executed.

Figure 5:
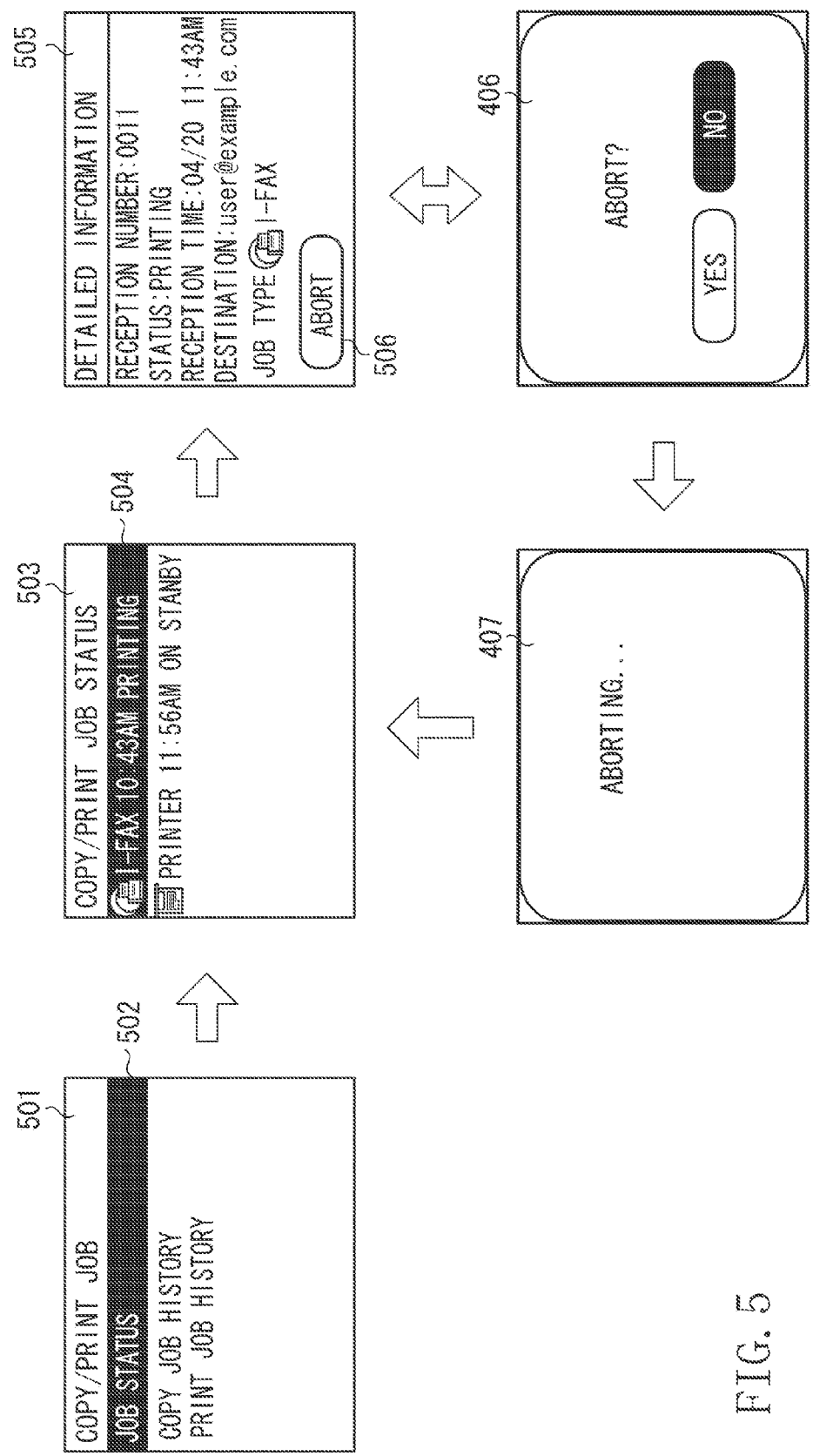
FIG. 5 is a diagram illustrating operation screens displayed on the panel and transition of the operation screens.

The user can abort the printing of an image based on an attached file of an electronic mail by a method different from using the stop key 315. FIG. 5 is a diagram illustrating examples of screens that the CPU 111 displays on the touch panel 320 of the operation unit 116. A screen 501 represents an operation screen related to a copy job and a print job. The user can check the progress of a job or jobs being printed and/or on standby for printing, and can abort the job(s) via the screen 501. If an option 502 is specified via the operation unit 116, the CPU 111 displays a screen 503 for checking the progress of a copy job(s) and/or a print job(s) submitted to a print queue. The user can specify each option displayed on the screen 503 to display detailed information about that job. If an option in the screen 503 is specified via the operation unit 116, the CPU 111 displays a screen for displaying detailed information about the job corresponding to the option. A screen 505 illustrates an example of the screen for displaying detailed information (a detailed information screen) when an option 504 is specified. The user can abort the job being printed or on standby for printing by specifying an abort key 506 displayed on the detailed information screen. If the abort key 506 is specified, the CPU 111 displays the confirmation screen 406 on the touch panel 320. If "YES" is specified, the CPU 111 makes the screen to be displayed on the touch panel 320 transition to the screen 407, and aborts the corresponding job. If the abort processing ends, the screen 407 transitions to the screen 503. If "NO" is specified, the confirmation screen 406 transitions to the screen 505.

In such a manner, the reception print function according to the present exemplary embodiment enables an abort of the print processing during printing of an image based on an attached file of an electronic mail.

In some cases, the user may want to abort the print processing being executed and subsequently reprint the image. For example, the user may want to restart printing in a format different from that of a desired output result. Specifically, the user may want to perform reprinting with a change in the size of the sheet used for printing. The user may perform reprinting with a different color setting for output and/or a different setting about whether to add a reception footer.

In such cases, the user wants to change a setting related to printing so that a desired output result can be obtained, and then restart the printing of the same data based on the new setting.

For example, if the user aborts printing based on page description language (PDL) data submitted from the PC 102 and the PDL data is deleted, the same PDL data can be submitted from the PC 102 again to perform reprinting.

On the other hand, if printing based on an attached file of an electronic mail is aborted and the same end processing as with the completion of print processing is performed, the received electronic mail and the image are discarded and the electronic mail is deleted from the POP server as well. In such a case, reprinting is not able to be performed.

If, when the printing based on the attached file of the electronic mail is aborted, the received file or the image is left inside the image forming apparatus, the image forming apparatus can perform reprinting after the change of the print setting.

However, the image forming apparatus does not have much storage area for temporarily storing data. If many images are stored in the image forming apparatus, the storage area may become tight and an operation of other functions of the image forming apparatus may be affected.

To address such a problem, a control for enabling reprinting of an image if printing of the image based on an attached file of an electronic mail is aborted will be described.

Figure 6:
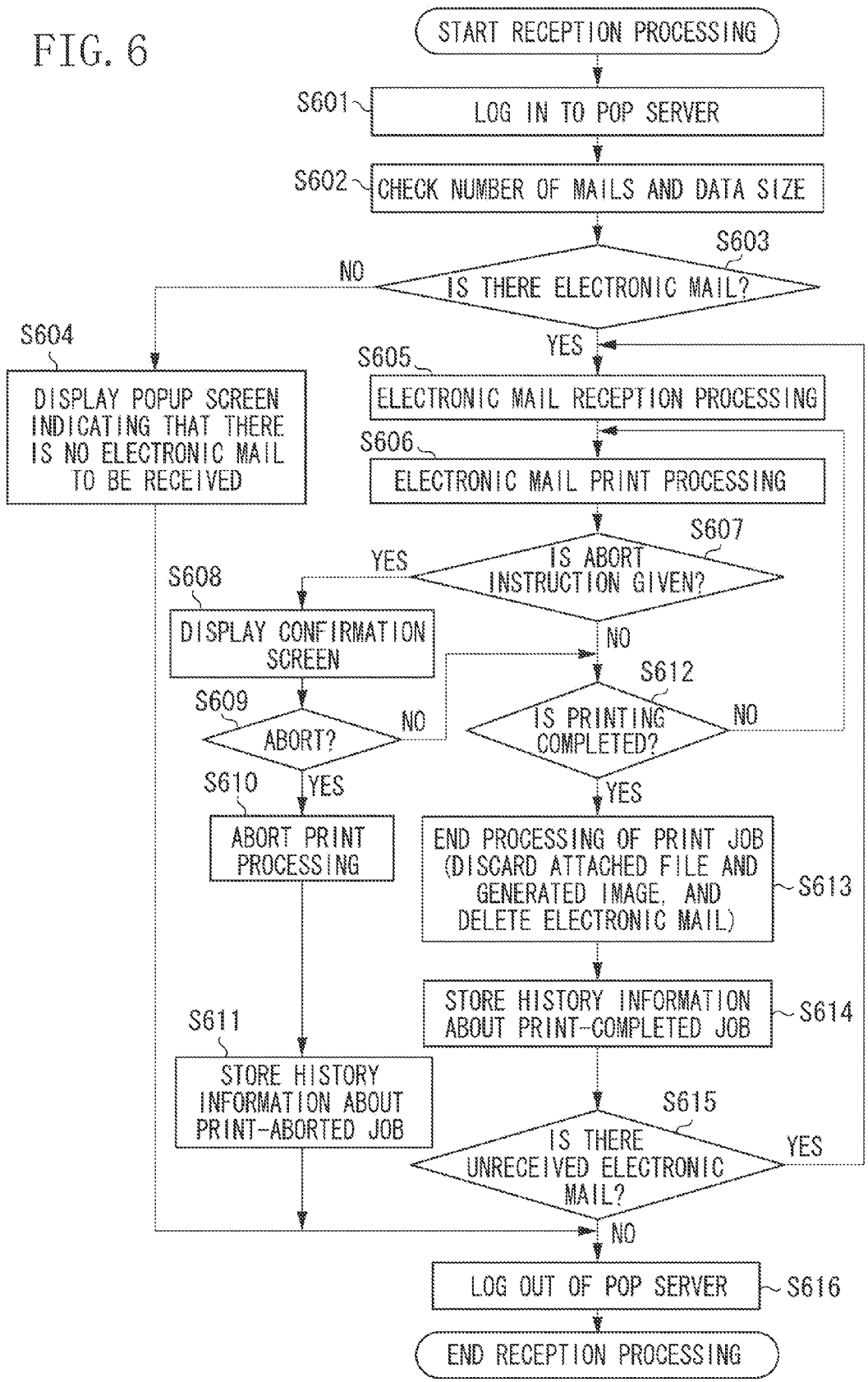
FIG. 6 is a flowchart for describing control for receiving and printing an electronic mail.

A specific control will be described with reference to a flowchart of FIG. 6. Each operation (step) of the flowchart illustrated in FIG. 6 is implemented by the CPU 111 reading a control program stored in the ROM 112 or the storage 114 into the RAM 113, and executing the control program. The CPU 111 performs the control corresponding to the flowchart illustrated in FIG. 6, when an instruction to manually receive an electronic mail is given or when an inquiry is made to the POP server at set automatic reception intervals.

In step S601, the CPU 111 transmits a user ID and a password stored in the storage 114 to the POP server, and requests login (authentication). In a case of an inquiry to the POP server by manual reception, the CPU 111 displays the screen 405 notifying the user that a connection is being made to the POP server on the touch panel 320.

If the login succeeds, the processing proceeds to step S602. If the login fails, the CPU 111 displays a connection error screen (not illustrated) on the touch panel 320, and the processing ends.

In step S602, the CPU 111 transmits a STAT command to the POP server, and waits for a response from the POP server. The STAT command is a command for checking the number of mails stored in a mail box of the login user and a data size thereof. If the CPU 111 receives a response from the POP server, the processing proceeds to step S603.

In step S603, if the number of mails stored in the mail box is zero based on the response received from the POP server, the CPU 111 determines that there is no electronic mail (NO in step S603), and the processing proceeds to step S604. If the number of mails stored in the mail box is one or more based on the response, the CPU 111 determines that there is an electronic mail (YES in step S603), and the processing proceeds to step S605. Here, the CPU 111 stores the obtained number of mails into the RAM 113 as the number of unreceived electronic mails.

In step S604, in the case of an inquiry to the POP server by manual reception, the CPU 111 displays the popup screen 404 indicating that there is no electronic mail to be received on the touch panel 320. The processing proceeds to logout processing of step S616. If a predetermined time (for example, two seconds) set in advance has elapsed with the popup screen 404 displayed, the CPU 111 closes the popup screen 404.

In step S605, the CPU 111 transmits an RETR command specifying a message number corresponding to an electronic mail to be received to the POP server, and receives the electronic mail. Even if there is a plurality of unreceived electronic mails, the CPU 111 receives one of the electronic mails. The CPU 111 obtains an attached file attached to the received electronic mail.

In step S606, the CPU 111 decodes the attached file of the electronic mail to generate an image to be used for printing. The CPU 111 then feeds a sheet to be used for printing to the printing unit 120, and controls the printing unit 120 to print the generated image on the sheet based on the reception print settings made by the user.

In step S607, while the printing unit 120 is printing the image based on the attached file of the electronic mail, the CPU 111 determines whether an abort instruction is given via the operation unit 116. Specifically, if the stop key 315 is pressed while the printing unit 120 is printing the image based on the attached file of the electronic mail, the CPU 111 determines that an abort instruction is given (YES in step S607), and the processing proceeds to step S608. If an operation to abort a print job being printed is accepted via the foregoing confirmation screen 406 of the print job during the printing of the image based on the attached file of the electronic mail, the CPU 111 also determines that an abort instruction is given (YES in step S607), and the processing proceeds to step S608. If an abort instruction is not given (NO in step S608), the processing proceeds to step S612.

In step S608, the CPU 111 displays a confirmation screen for inquiring the user whether to abort the printing on the touch panel 320. The confirmation screen 406 illustrated in FIGS. 4 and 5 is an example of the confirmation screen. In step S609, the CPU 111 determines whether an instruction to abort is given via the confirmation screen. If "YES" is specified via the confirmation screen (YES in step S609), the processing proceeds to step S610. If "NO" is specified or no instruction is input (NO in step S609), the processing proceeds to step S612. If "NO" is specified, the CPU 111 closes the confirmation screen displayed on the touch panel 320, and displays the original screen (if the abort instruction is given by using the stop key 315, the original screen means the screen 405; if the abort instruction of the job is given from the confirmation screen, the original screen means the screen 505) on the touch panel 320.

The processing of steps S608 and S609 is intended to suppress aborting of a print job by an erroneous operation.

In step S610, the CPU 111 controls the printing unit 120 to abort the print processing of the image. If the printing of a sheet has already started by the time of step S610, the CPU 111 controls the printing unit 120 to complete the printing of the sheet. The CPU 111 discards the received attached file and the image generated in step S606. Here, the CPU 111 displays the confirmation screen 406 indicating that an abort is in process on the touch panel 320. If the abort processing is completed, the processing proceeds to step S611.

In step S611, the CPU 111 stores history information about the print-aborted job into the storage 114. The processing proceeds to step S616. The history information stored in step S611 includes at least information indicating that the job is aborted based on an abort instruction. Details will be described below.

As described in step S610, if the abort processing is performed based on an abort instruction, the CPU 111 performs control to complete printing of a sheet of which the printing has already started. Even if the abort processing is consequently too late and the image to be output is all output, the CPU 111 performs control not to delete the electronic mail. By such processing, higher priority can be given to the user's intention to perform reprinting.

In step S612, the CPU 111 determines whether the printing of the image by the printing unit 120 is completed. If the printing is completed (YES in step S612), the processing proceeds to step S613. If the printing is not completed (NO in step S612), the processing returns to step S606. Specifically, if a command notifying of completion of sheet discharge is received from the printing unit 120, the CPU 111 determines that the printing is completed. The CPU 111 may determine that the printing is completed based on passing of a not-illustrated fixing unit or that a predetermined operation is made by the user after the completion of sheet discharge.

In step S613, the CPU 111 performs end processing of the print job. Specifically, the CPU 111 discards the attached file and the image generated in step S606. The CPU 111 also transmits a DELE command specifying the message number corresponding to the electronic mail received in step S605 to the POP server, thereby instructing the POP server to delete the electronic mail. The DELE command is a command for deleting the electronic mail having the specified message number.

In step S614, the CPU 111 stores the history information about the print-completed reception job into the storage 114. Then, the processing proceeds to step S615.

In step S615, if there is an electronic mail not received from the mail server 103, the processing returns to step S605. In step S605, the CPU 111 receives the next electronic mail. On the other hand, if all the electronic mails stored in the mail server 103 have been received (NO in step S615), the processing proceeds to step S616.

In step S616, the CPU 111 logs out of the POP server. Specifically, the CPU 111 transmits a QUIT command to the POP server to terminate the communication session with the POP server. In the case of an inquiry to the POP server by manual reception, the CPU 111 displays the received job screen 402 on the touch panel 320. And, the processing ends.

A method for presenting the history information stored in the flowchart of FIG. 6 to the user will be described. FIG. 7 is a diagram illustrating examples of setting screens displayed on the touch panel 320 of the operation unit 116. A screen 701 represents an example of a screen that presents a history of received jobs to the user. The user can specify "JOB HISTORY" on the received job screen 402 of FIG. 4 to check the history of received jobs.

If the "JOB HISTORY" is specified via the received job screen 402, the CPU 111 makes the screen to be displayed on the touch panel 320 to the screen 701. The screen 701 displays an execution history of jobs for printing an image based on an attached file of an electronic mail. The present exemplary embodiment deals with a case where a reception history of Group 3 (G3) facsimiles via a not-illustrated modem is also displayed on the same screen 701. An option 702 represents an example of history information about a job that is aborted by an abort instruction. The user can specify each option displayed on the screen 701 to check details of the history information. If an option displayed on the screen 701 is specified, the CPU 111 displays a detail confirmation screen corresponding to the specified option. A screen 703 represents an example of the detail confirmation screen. The screen 703 is a detail confirmation screen when the option 702 is specified. The detail confirmation screen displays information about a serial number of the job, an execution result (OK or NG), a start time, destination information, and a job type. Such information is stored in the storage 114 in the foregoing steps S611 and S614. Information such as the number of printed sheets may also be included.

"#123" is an example of an error code. The error code is a number indicating a type and content of an error due to which the print processing ends in error. In the present exemplary embodiment, an abort of print processing based on an abort instruction is thus handled as an error. The user can refer to documents such as a manual of the MFP 101 to find out the content of the error corresponding to the error code. The error code "#123" is for situations where a job is aborted during standby for printing and during printing of an image based on an attached file of an electronic mail.

The user can thus check the abort-instructed print processing via the screens 701 and 703. Even if whether the print processing is aborted is not able to be determined from the output print product, the user can check that the print processing is aborted via the screens 701 and 703.

In the present exemplary embodiment, the history information is described to be displayed on the touch panel 320. However, this is not restrictive. The history information may be able to be printed as well.

As described above, according to the present exemplary embodiment, if an instruction to abort printing of an image based on an attached file of an electronic mail is given, the print processing is aborted but the electronic mail is controlled not to be deleted from the mail server 103. On the other hand, if an instruction to abort the printing of the image based on the attached file of the electronic mail is not given, the electronic mail is controlled to be deleted from the mail server 103 after the completion of the print processing. Consequently, the user can give an instruction to abort the print processing, change print settings so that a desired output result can be obtained, and then make an inquiry to the mail server 103 to reprint the image based on the attached file of the electronic mail.

The first exemplary embodiment has dealt with the case where if an instruction to abort printing of an image based on an attached file of an electronic mail is given, the print processing is aborted but the electronic mail is controlled not to be deleted from the mail server 103. A second exemplary embodiment deals with a case where if the printing of an image based on an attached file of an electronic mail is aborted, whether to reprint the image is inquired of the user in addition to the control of the first exemplary embodiment.

A specific control will be described with reference to a flowchart of FIGS. 8A and 8B. Each operation (step) of the flowchart is implemented by the CPU 111 reading a control program stored in the ROM 112 or the storage 114 into the RAM 113 and executing the control program. The CPU 111 performs the control corresponding to the flowchart illustrated in FIGS. 8A and 8B if an instruction to manually receive an electronic mail is given or if an inquiry is made to the POP server at set automatic reception intervals.

Figure 8B:
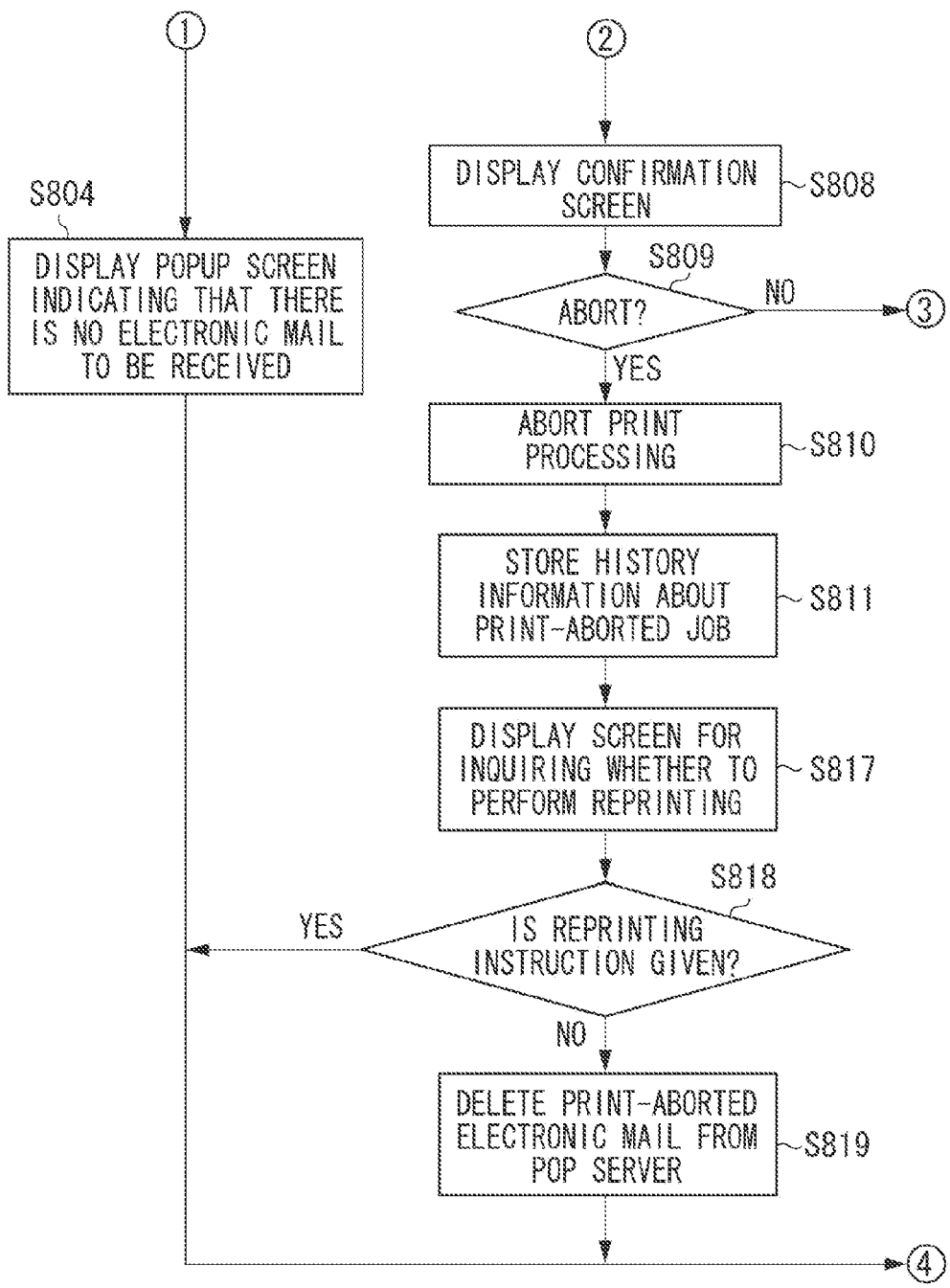
FIG. 8, composed of FIG. 8A and FIG. 8B, is a flowchart for describing control for receiving and printing an electronic mail.

The flowchart illustrated in FIGS. 8A and 8B is an alternative to the flowchart according to the first exemplary embodiment, illustrated in FIG. 6. Processing of steps S801 to S816 is similar to that of steps S601 to S616 according to the first exemplary embodiment. In the present exemplary embodiment, processing of steps S817 to S819 is performed in addition to the control according to the first exemplary embodiment.

In step S817, the CPU 111 displays a screen for inquiring whether to perform reprinting on the touch panel 320. FIG. 9 is a diagram illustrating examples of screens that the CPU 111 displays on the touch panel 320. A screen 903 is an example of an inquiry screen for inquiring whether to perform reprinting. The user can specify whether to perform reprinting via the screen 903.

In step S818, the CPU 111 determines whether an instruction for reprinting is given via the inquiry screen. If "YES" is specified via the inquiry screen (YES in step S818), the processing proceeds to the logout processing of step S816. If "NO" is specified (NO in step S819), the processing proceeds to step S819.

In step S819, the CPU 111 transmits a DELE command specifying the message number corresponding to the electronic mail received in step S805 to the POP server, thereby instructing the POP server to delete the electronic mail.

In the present exemplary embodiment, the inquiry (setting) about whether to perform reprinting is made at timing after the print processing is aborted. However, this is not restrictive. For example, the inquiry about whether to perform reprinting may be made after the abort instruction is given and before the print processing is aborted.

As described above, the control of steps S817 to S819 can be performed to prevent the electronic mail from remaining in the mail server 103 and wasting memory resources of the mail server 103 although the user has no intention to perform preprinting.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present invention, if printing of an image based on an attached file of an electronic mail received from the mail server 103 is aborted, the image can be reprinted.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-088799, filed Apr. 23, 2015, which is hereby incorporated by reference herein in its entirety.

What is claimed is:
1. An image forming apparatus comprising:
a communication interface configured to receive an electronic mail from a mail server;

a storage unit configured to store an image based on a file attached to the electronic mail received by the communication interface;

a printing unit configured to print the image on a sheet;

a deletion unit configured to delete the image from the storage unit and to transmit an instruction to delete the electronic mail stored in the mail server; and a user interface configured to accept a stop instruction of printing, wherein the deletion unit is configured to delete the image from the storage unit and to transmit the instruction to delete the electronic mail from the mail server, in accordance with printing of the image being completed, and to delete the image from the storage unit and not to transmit the instruction to delete the electronic mail from the mail server, in accordance with the stop instruction being accepted by the user interface in printing of the image, and wherein the deletion unit is implemented by a processor and a memory.

2. The image forming apparatus according to claim 1, further comprising a check unit configured to check execution of stop of printing according to the stop instruction after accepting the stop instruction, wherein the user interface accepts a first instruction or a second instruction when the check unit checks the execution of the stop of printing according to the stop instruction, wherein the deletion unit is further configured not to transmit the instruction to delete the electronic mail from the mail server in accordance with the first instruction being accepted by the user interface and to transmit the instruction to delete the electronic mail from the mail server in accordance with the second instruction being accepted by the user interface, and wherein the check unit is implemented by a processor and a memory.

3. The image forming apparatus according to claim 1, further comprising a control unit configured to, in a case where a predetermined condition for receiving the electronic mail is satisfied, cause the communication interface to receive the electronic mail stored in the mail server, and in a case where there is an unreceived electronic mail after printing of the image is completed, cause the communication interface to begin to receive the unreceived electronic mail stored in the mail server, and wherein the control unit is implemented by a processor and a memory.

4. The image forming apparatus according to claim 1, further comprising a second storage unit configured to store history information about printing, wherein the second storage unit stores, in accordance with the stop instruction being accepted in printing of the image, history information including at least information that printing of the image is stopped.

5. The image forming apparatus according to claim 1, wherein the stop instruction is provided via a stop key arranged on the user interface.

6. The image forming apparatus according to claim 1, wherein the stop instruction is provided via a confirmation screen for confirming progress of print processing.

7. An image forming apparatus comprising:

a communication interface configured to receive an electronic mail from a mail server;

a storage unit configured to store an image based on a file attached to the electronic mail received by the communication interface;

a printing unit configured to print the image on a sheet;

a first deletion unit configured to transmit an instruction to delete the electronic mail stored in the mail server;

a second deletion unit configured to delete the electronic mail stored in the storage unit; and a user interface configured to accept a stop instruction of printing, wherein the first deletion unit and the second deletion unit are configured to delete the received electronic mail from the storage unit and to transmit the instruction to delete the electronic mail from the mail server, in accordance with printing of the image being completed, and the first deletion unit and the second deletion unit are configured not to transmit the instruction to delete the electronic mail from the mail server and to delete the received electronic mail from the storage unit, in accordance with the stop instruction being accepted by the user interface in printing of the image, wherein at least one of the first deletion unit and the second deletion unit is implemented by a processor and a memory.

8. A method for controlling an image forming apparatus that executes printing on a sheet, the method comprising:

receiving an electronic mail from a mail server;

storing an image based on a file attached to the received electronic mail into a storage unit;

printing the image on a sheet;

accepting a stop instruction of printing; and transmitting an instruction to delete the electronic mail from the mail server and deleting the image from the storage unit, in accordance with printing of the image being completed, not transmitting the instruction to delete the electronic mail from the mail server, and deleting the image from the storage unit, in accordance with the stop instruction being accepted in printing of the image.

9. The image forming apparatus according to claim 1, wherein the printing unit stops the printing of the image in accordance with the stop instruction being accepted by the user interface in the printing of the image.

10. The image forming apparatus according to claim 1, wherein the communication interface receives again the electronic mail that has not been deleted from the mail server, and an image based on a file attached to the electronic mail received again is printed.

11. The image forming apparatus according to claim 1, wherein the deletion unit transmits the instruction to delete the electronic mail to the mail server in accordance with the printing of the image being completed without accepting the stop instruction in printing of the image.

* * * * *